United States Patent
Moretti et al.

(10) Patent No.: US 6,672,681 B1
(45) Date of Patent: Jan. 6, 2004

(54) RAILWAY AXLE HUB UNIT

(75) Inventors: Roberto Moretti, Cambiano (IT); Silvano Sema, Cercenasco (IT); Matteo Genero, Santena (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 09/914,885
(22) PCT Filed: Feb. 29, 2000
(86) PCT No.: PCT/EP00/01690
§ 371 (c)(1), (2), (4) Date: Nov. 21, 2001
(87) PCT Pub. No.: WO00/51869
PCT Pub. Date: Sep. 8, 2000

(30) Foreign Application Priority Data

Mar. 4, 1999 (IT) ......................... TO99A0164

(51) Int. Cl.$^7$ ............................ G01N 1/00; B60B 27/00
(52) U.S. Cl. .......................................... 301/109; 73/658
(58) Field of Search ................ 301/105.1, 109, 301/110; 73/593, 659, 649, 658; 340/682, 683; 116/73, 35 R

(56) References Cited

U.S. PATENT DOCUMENTS

| | | | |
|---|---|---|---|
| 3,745,815 A | | 7/1973 | Bentone et al. |
| 5,631,426 A | * | 5/1997 | Jao ............................. 73/644 |
| 5,959,365 A | * | 9/1999 | Mantini et al. ............ 307/10.1 |
| 6,304,406 B1 | * | 10/2001 | Douglas et al. .......... 360/73.03 |
| 6,435,027 B1 | * | 8/2002 | Colarelli et al. ............. 73/462 |
| 6,471,407 B1 | * | 10/2002 | Katano ....................... 384/448 |
| 6,474,832 B2 | * | 11/2002 | Murray ....................... 362/192 |

FOREIGN PATENT DOCUMENTS

| | | |
|---|---|---|
| DE | 197 30 212 | 7/1997 |
| GB | 1 514 792 | 7/1975 |
| GB | 2 173 865 | 4/1985 |
| WO | WO 97/22095 | 6/1997 |
| WO | WO 98/11356 | 3/1998 |

* cited by examiner

*Primary Examiner*—S. Joseph Morano
*Assistant Examiner*—Long Bao Nguyen
(74) *Attorney, Agent, or Firm*—Merchant & Gould P.C.

(57) ABSTRACT

A railway axle hub unit of the type including an axle box housing (1) for supporting a bearing, is provided with a sensor body (3, 9) containing sensors (4, 5) for detecting vibration in the vertical direction and the horizontal axial direction. The sensor body is mounted onto a stationary support element (2, 1, 15) rigidly secured to the bearing, preferably an annular sealing insert. The sensors perform monitoring of the operation condition of the hub unit by generating and transmitting signals indicative of the detected level of vibration to an electronic processing unit mounted on board of the railway vehicle or the train. The processing unit is capable of signalling in real time an impending failure and/or a damaged condition associated with the monitored hub unit.

9 Claims, 3 Drawing Sheets

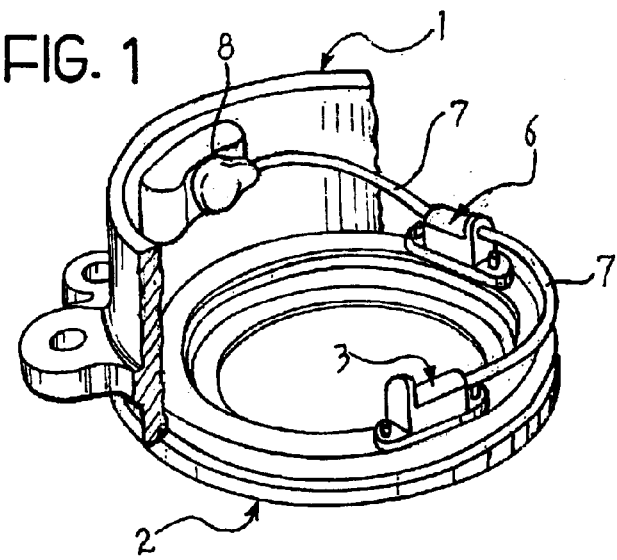
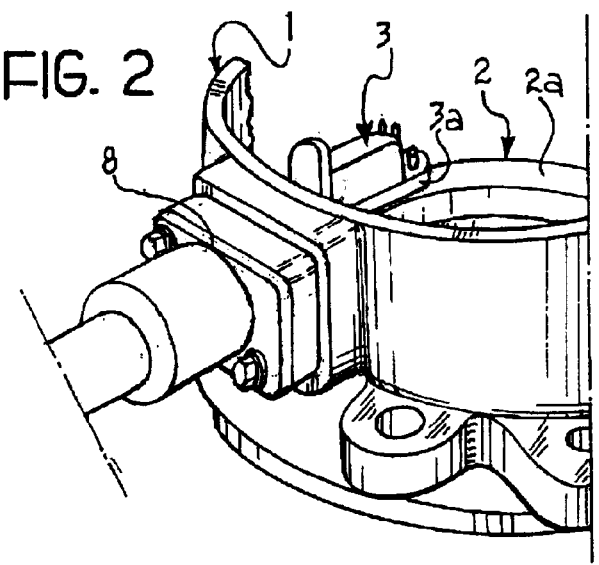
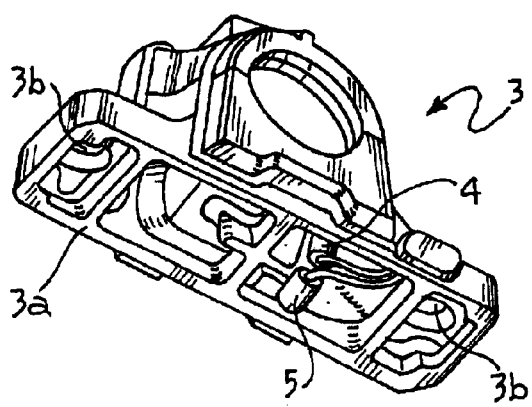

RAILWAY AXLE HUB UNIT

TECHNICAL FIELD

The present invention refers to a railway axle hub unit of the type comprising an axle box housing for supporting a bearing.

BACKGROUND ART

Mechanical deterioration of the axle supporting bearings, besides adversely affecting the operational performance of the axle, also reduces the safety of the vehicle and may lead to the failure of the bearing, with catastrophic consequences such as derailment.

The main structural or functional defects which bearings of the above kind or the relative wheel are subject to can be summarised as follows:

manufacturing or assembling defects of the bearing, which provoke an excessive play between its components (inner and outer raceways, rolling bodies, retaining cages, sealing devices, shoulders defining the axial position of the bearing with respect to the axle); cracks or spalls due to fatigue; local pitting due to an electrical current passing through the bearing; rust marks;

insufficient lubrication of the inner parts of the bearing; polluted or deteriorated lubricant;

flats in the rolling surface of a wheel due to the wheel being locked while the railway vehicle is travelling; excessive wear of the wheel profile in the rail contact zone;

axial play of the wheel with respect to the axle, whereby the rotation axis of the wheel is not perpendicular to a vertical plane.

Up to now methods of checking the conditions of the bearings have been limited to periodical maintenance interventions. With such interventions, all the bearings of a same vehicle are replaced regardless of their conditions, including bearings being still valid and not needing to be replaced.

It will be understood that this way of proceeding first of all involves high costs of labour and passive costs for leaving the vehicle unused, but above all it does not allow to predict or detect the occurrence of failures in time before the bearing is so deteriorated to represent a condition of potential danger. Therefore, there is the risk of continuing to use a defective bearing or wheel for prolonged periods till the moment set by the maintenance schedule for replacement.

U.S. Pat. No. 5,433,111 discloses an apparatus for detecting defective conditions associated with a set of railway vehicle wheels and with a railtrack upon which a given railway vehicle travels. The apparatus comprises measurement means for generating data indicative of rotational rate of the wheels, a set of accelerometers adapted to generate data indicative of motion along three orthogonal axes, wherein one of the axes is generally vertical with respect to the railtrack, and a data processor adapted to detect, based on the received rotational rate and motion data, a defective condition associated with at least one wheel of the vehicle.

U.S. Pat. No. 5,381,692 refers to a monitoring system of a bearing assembly for supporting the drive shaft of a helicopter. The system has a vibration sensor for providing signals indicative of the vibrations emanating from the bearing assembly, first temperature sensing means for providing signals indicative of the bearing assembly operating temperature and second temperature sensing means for providing signals indicative of the ambient temperature. An alarm subsystem in response to the vibration and temperature signals provides an alarm signal warning of degradation condition of the bearing.

DISCLOSURE OF INVENTION

It is an object of the present invention to predict and/or identify in time and give a warning of the presence of a defect, the kind of defect and its precise location, in particular distinguishing which wheel of the vehicle or train is affected by the defect, and more particularly distinguishing whether the defect is affecting the wheel, its bearing or one of the components of the latter.

Another object of the present invention is to provide a continuous and real time monitoring of the operating condition of the bearing to obtain real time information concerning the variation of the defect in time, so that it is possible to intervene with urgency for severe failures, or delay intervention depending on the gravity of the detected failure, or consider the opportunity of not intervening, for example when an operation defect is stabilised or is stabilising.

Another object of the invention is to optimise maintenance, so as to intervene only when it is appropriate or necessary, and replace only the bearing individuated as defected or worn out.

These and other objects, which will be better understood herein after, are achieved according to the present invention by a railway axle hub unit of the type comprising an axle box housing for supporting a bearing, characterised by being equipped with sensor means for detecting vibration in a generally vertical direction, said sensor means being mounted onto a stationary support element rigidly secured to the bearing, said sensor means being adapted for generating and transmitting signals indicative of the detected level of vibration to an electronic processing unit on board of the railway vehicle or the train, whereby said processing unit is capable of signalling in real time an impending failure and/or a damaged condition associated with said monitored hub unit.

A further object of the invention is to provide a hub unit equipped with vibration sensors located at an optimal position for detecting the vibrations which the bearing and the wheel are subjected to, and for individuating correctly the nature, the location and the extent of possible defects.

This object is accomplished by a hub unit having the features defined in claims 2 to 4.

Further important features are defined in the other depending claims.

BRIEF DESCRIPTION OF DRAWINGS

The characteristics and advantages of the invention will become apparent from the detailed description of a few embodiments thereof with reference to the appended drawings, provided purely by way of non-limiting example, in which:

FIG. 1 is a perspective view, with some parts broken off, showing the inside of a housing of the bearing and sensors unit according to the present invention;

FIG. 2 is a perspective view, with some parts broken off, showing the outside of the housing of FIG. 1;

FIG. 3 is a perspective view, to an enlarged scale, of a sensor carrier body equipped with two vibration sensors oriented in different directions;

MODES FOR CARRYING OUT THE INVENTION

Figure 4:
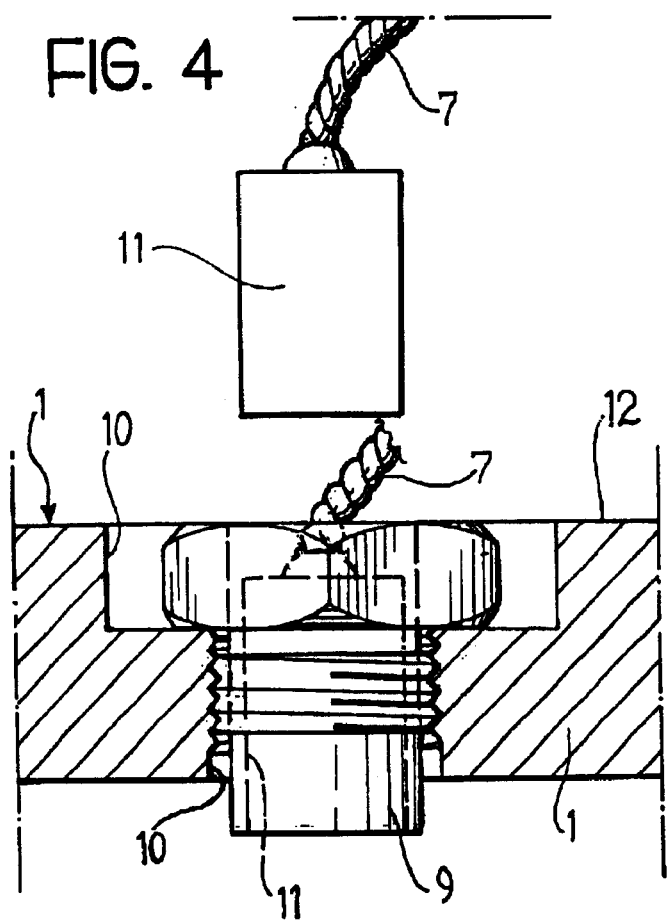
FIGS. 4 and 5 are front views schematically showing two respective variants of the sensor carrier body of FIG. 3.

Referring initially to FIG. 1, numeral 1 designates overall a substantially cylindrical bearing housing fixable in known manner to a railway vehicle for supporting a rolling contact bearing housed therein and not shown for simplicity.

A metal annular insert 2, adapted for sealing the bearing from the outboard side, is press fitted onto the radially outer race (indicated 17 in FIG. 6) of the axle bearing. Preferably, the sealing insert 2 is made of cold forged steel plate about 2 mm thick.

With reference also to FIG. 3, in accordance with the invention, mounted on the sealing insert 2 is a sensor body 3 containing a bi-directional accelerometer device comprised of a first accelerometer 4 oriented in the vertical direction and a second accelerometer 5 oriented in the horizontal axial direction.

Advantageously, the sensor body 3 is positioned on the sealing insert 2 at a position vertically aligned with the axis of rotation of the bearing, where the vibrations are more intense. Preferably, the sensor body is positioned in the higher part of the insert (in other words at 12 o'clock), i.e. in correspondence of the zone where the rolling bodies of the bearing undergo the maximum load.

The sensor body 3 forms a base portion 3a for resting onto a radial surface 2a of the sealing insert 2, with a pair of bores 3b for allowing the passage of respective fastening elements (not shown) for securing in removable manner the sensor body 3 to the insert 2.

The accelerometers 4 and 5 are preferably of the piezoelectric type, associated with respective amplifiers (not shown) incorporated in the sensor body.

The accelerometer 4 detects vertical vibrations which the bearing/wheel assembly is subjected to. The accelerometer 5 serves to detect horizontal vibrations provoked by the wheel rim hitting against the rail as the vehicle oscillates along the track.

In the example shown in FIG. 1, a further sensor body indicated overall at 6 is mounted on the sealing insert 2 at a location distinct from where the sensor body 3 is fitted. The sensor body 6 incorporates motion sensors, such as a rotational speed sensor detecting the passage of the poles of a magnetised ring rotating fast with the rotating race of the bearing, and possibly other motion sensors such as a sensor for detecting the direction of rotation.

Differently from what is shown by way of example in FIG. 1, all the sensors which the housing is equipped with may be incorporated in a single sensor body 3, as shown in FIG. 3. In this case the sealing insert 2 has an aperture (not shown) at the location of sensor body 3 for allowing the motion sensors to face the aforesaid magnetised ring.

In a preferred embodiment, besides the vibration and motion sensors, also a temperature sensor (not shown) is included for signalling the occurrence of temperatures higher than those of normal operation and indicating that the friction within the bearing is exceeding a pre-set threshold value of admissibility.

The signals generated by the various sensors are transmitted through a cable 7 to a multi-pin connector 8 mounted on the same housing 1.

From the connector 8, the various signals from the various sensors are transmitted to an electronic processing unit (not shown) mounted on board of the railway vehicle or train. Said unit processes the received signals and is provided with suitable software adapted for recognising conditions of defective operation, such as e.g. excessively high temperature or irregular vibration frequencies related to determined defects, and once a defect has been detected, signalling its presence and variation with time.

When at least one of the signals related to one of the monitored parameters exceeds a predetermined threshold level, the processing unit generates an alarm signal that allows to intervene at the right moment to remove the defect and restore conditions of safe and correct operation.

The parameters may indifferently be monitored continuously or periodically, according to requirements or to the gravity of the defect possibly detected.

Figure 5:
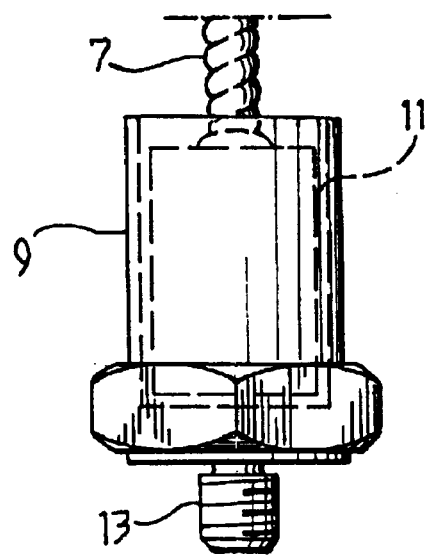

According to an alternative embodiment of the invention, shown in FIGS. 4 and 5, the sensor body may have the shape of a hollow cylinder 9 adapted to be secured, for example by screwing, in a recessed seat 10 formed directly in the housing 1. A capsule 11 containing the above sensors is locked within the cylinder 9.

In the variant of FIG. 4, the seat 10 is formed and dimensioned with two different diameters so that the sensor body 9, once fitted in the seat 10, remains flush with the outer surface 12 of the housing 1.

In the variant of FIG. 5, the cylindrical body 9 is designed to project outwardly of the housing and is coupled thereto by means of a lower threaded portion 13.

Figure 6:
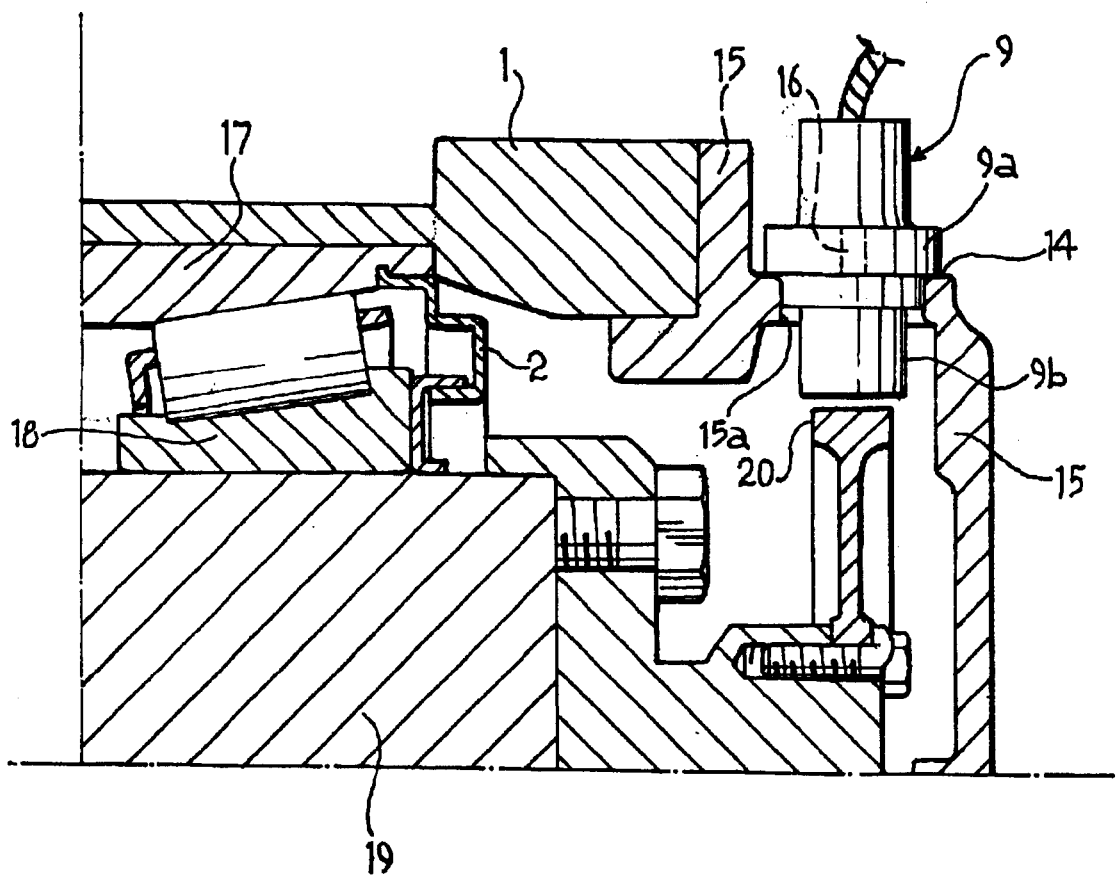
FIG. 6 is a partial cross sectional view of a further variant of a sensor carrier.

In the variant of FIG. 6, a flange portion 9a is integrally formed with the sensor body 9. The flange portion 9a serves to rest and fix the sensor body 9 onto an outer surface 14 of the housing 1 or, as is the case of the example of FIG. 6, a cover member 15 that closes the housing 1 on the outboard side. The flange portion 9a has a pair of bores 16 (only one of which is shown in FIG. 6) for accommodating fastening elements, for example screws or bolts, for removably securing the sensor body 9 to the cover member 15 (or the housing 1). In this way the sensor body is accessible from the outside whereby it can be removed easily for overhauling or replacing the sensors. Furthermore, the variant of FIG. 6 is advantageous in that is applicable to any kind of conventional axle unit. In FIG. 6, numeral 17 designates the outer, stationary race of the bearing, and numeral 18 designates the inner race rotating fast with the axle 19 and an impulse ring or phonic wheel 20. A sensor (not shown) for detecting the rotational speed of axle 19 is mounted in the radially inner end portion 9b of the sensor body 9 and projects through an opening 15a of the cover member 15 so as to operationally face the impulse ring 20. It should be noted that the sensor body 9 may also accommodate a temperature sensor and/or other motion sensors of known kind.

It will be appreciated that the present invention allows to identify the precise location and nature of a defect, and to distinguish and distinctly signal the several defects listed in the introductory part of the description. The processing unit software is capable of distinguishing whether vibrations are caused by defects of the bearing/wheel assembly or simply due to the passage of the vehicle over deflected rails or switches.

Locating the vibration sensors at the shield of the sealing device has turned out to be particularly advantageous, especially for reading vibration signals. Whilst it is not desired to be bound to any specific theory in this connection, tests carried out by the Applicant show that the sealing insert, by virtue of its stiff and thin structure intimately fixed to the bearing, constitutes an ideal path for the transmission of vibration.

Moreover, locating the sensors on the sealing insert keeps some space free within the housing to be possibly used for mounting therein a power generator for supplying current to the electronics for analysing the monitored signals. This possibility is of particular interest for applications on wagons having no electric supply.

While only certain features of the invention have been described and illustrated herein, many modifications, substitutions, changes and equivalents will now occur to those skilled in the art. For example, the detected signals can be transmitted by wire or radio transmission to a general processing unit located in a remote position, e.g. in the driver's cab.

What is claimed is:

1. A railway axle hub unit comprising an axle box housing for supporting a bearing, the unit being equipped with sensor means for detecting vibration in a generally vertical direction, said sensor means being mounted onto a stationary support element rigidly secured to the bearing, said sensor means being adapted for generating and transmitting signals indicative of the detected level of vibration to an electronic processing unit on board of a railway vehicle or train, whereby said processing unit is capable of signaling in real time an impending failure and/or a damaged condition associated with said monitored hub unit, wherein said stationary support element is a sealing annular insert of sheet metal.

2. A hub unit as claimed in claim 1, wherein said sensor means are mounted onto said sealing annular insert at a position vertically aligned with an axis of rotation of the bearing.

3. A hub unit as claimed in claim 2, wherein said sensor means are mounted onto said sealing annular insert at a position vertically aligned above the axis of rotation of the bearing.

4. A hub unit as claimed in claim 1, wherein said sensor means are incorporated in a sensor body further including sensor means for detecting vibration in a horizontal, axial direction.

5. A hub unit as claimed in claim 1, further comprising sensor means for detecting a temperature of the bearing.

6. A hub unit as claimed in claim 1, further comprising sensor means for gauging a rotational speed of the axle and/or direction of rotation of the axle.

7. A hub unit as claimed in claim 4, wherein all said sensor means are housed within a single sensor body.

8. A hub unit as claimed in claim 1, wherein said sensor means for detecting vibration in a generally vertical direction includes a first accelerometer oriented in the vertical direction.

9. A hub unit as claimed in claim 4, wherein said sensor means for detecting vibration in a horizontal, axial direction includes a second accelerometer oriented in the horizontal axial direction.

* * * * *